United States Patent
Woods

(10) Patent No.: US 12,079,390 B2
(45) Date of Patent: Sep. 3, 2024

(54) METHOD AND SYSTEM FOR HAPTIC BEAMFORMING AND HAPTIC EFFECTS IN A HANDHELD CONTROLLER

(71) Applicant: Magic Leap, Inc., Plantaion, FL (US)

(72) Inventor: Michael Janusz Woods, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 227 days.

(21) Appl. No.: 17/522,333

(22) Filed: Nov. 9, 2021

(65) Prior Publication Data

US 2022/0137709 A1 May 5, 2022

Related U.S. Application Data

(63) Continuation of application No. PCT/US2020/031950, filed on May 7, 2020.

(60) Provisional application No. 62/846,509, filed on May 10, 2019.

(51) Int. Cl.
*G06F 3/01* (2006.01)
*A63F 13/245* (2014.01)
*A63F 13/285* (2014.01)

(52) U.S. Cl.
CPC .......... *G06F 3/016* (2013.01); *A63F 13/245* (2014.09); *A63F 13/285* (2014.09); *A63F 2300/8082* (2013.01)

(58) Field of Classification Search
CPC ......... G06F 3/016; A63F 13/285; A63F 13/24
See application file for complete search history.

(56) References Cited

U.S. PATENT DOCUMENTS

| | | |
|---|---|---|
| 2006/0192760 A1 | 8/2006 | Moore et al. |
| 2006/0281550 A1 | 12/2006 | Schena |
| 2010/0245237 A1 | 9/2010 | Nakamura |
| 2014/0292144 A1* | 10/2014 | Son ............. B06B 1/0603 310/317 |
| 2015/0133221 A1* | 5/2015 | Danny ............ A63F 13/92 345/184 |
| 2016/0144404 A1* | 5/2016 | Houston ......... H02K 33/00 318/114 |
| 2016/0258758 A1 | 9/2016 | Houston et al. |

(Continued)

FOREIGN PATENT DOCUMENTS

| | | |
|---|---|---|
| CN | 108885489 A | 11/2018 |
| JP | 2009035100 A | 2/2009 |
| JP | 2015095261 A | 5/2015 |

OTHER PUBLICATIONS

Application No. EP20806826.2, "Partial Supplementary European Search Report", May 23, 2022, 15 pages.

(Continued)

*Primary Examiner* — James S. McClellan
(74) *Attorney, Agent, or Firm* — KILPATRICK TOWNSEND & STOCKTON LLP

(57) ABSTRACT

A handheld controller includes a housing and a first vibration source disposed in the housing and characterized by a first phase. The handheld controller also includes a second vibration source disposed in the housing and characterized by a second phase different than the first phase and a controller disposed in the housing, coupled to the first vibration source and the second vibration source, and configured to vary at least one of the first phase or the second phase.

18 Claims, 9 Drawing Sheets

(56) References Cited

U.S. PATENT DOCUMENTS

2017/0106275 A1    4/2017    Tsuchiya et al.
2018/0039331 A1    2/2018    Warren
2018/0065151 A1    3/2018    Houston et al.

OTHER PUBLICATIONS

Application No. EP20806826.2, "Extended European Search Report", Aug. 24, 2022, 14 pages.
Application No. PCT/US2020/031950, International Preliminary Report on Patentability, mailed on Nov. 25, 2021, 9 pages.
Application No. PCT/US2020/031950, International Search Report and Written Opinion, mailed on Sep. 22, 2020, 12 pages.
PCT/US2020/031950, "Invitation to Pay Additional Fees and, Where Applicable, Protest Fee", mailed on Jul. 17, 2020, 2 pages.
EP20806826.2, "Office Action", Feb. 16, 2024, 4 pages.
JP2021-566216, "Office Action" and English translation, Jun. 3, 2024, 26 pages.

\* cited by examiner

METHOD AND SYSTEM FOR HAPTIC BEAMFORMING AND HAPTIC EFFECTS IN A HANDHELD CONTROLLER

CROSS-REFERENCES TO RELATED APPLICATIONS

This application is a continuation of International Patent Application No. PCT/US2020/031950, filed on May 7, 2020, entitled "METHOD AND SYSTEM FOR HAPTIC BEAMFORMING AND HAPTIC EFFECTS IN A HANDHELD CONTROLLER," which claims the benefit of and priority to U.S. Provisional Patent Application No. 62/846,509, filed on May 10, 2019, entitled "METHOD AND SYSTEM FOR HAPTIC BEAMFORMING AND HAPTIC EFFECTS IN A HANDHELD CONTROLLER," the entire disclosures of which are hereby incorporated by reference, for all purposes, as if fully set forth herein.

BACKGROUND OF THE INVENTION

Modern computing and display technologies have facilitated the development of systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to other actual real-world visual input; an AR scenario typically involves presentation of digital or virtual image information as an augmentation to visualization of the actual real-world around the user.

In order to provide a realistic AR experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a handheld controller or totem (e.g., a physical "bat" communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Despite the progress made in these display technologies, there is a need in the art for improved methods and systems related to augmented reality systems, particularly, handheld controllers for AR and VR systems.

SUMMARY OF THE INVENTION

The present disclosure relates to virtual reality and/or augmented reality imaging and visualization systems. The present disclosure relates generally to methods and systems related to haptic effects in handheld devices. In some particular embodiments, a phased array emitter including multiple vibration sources, each with controllable phase, is utilized to generate a coherent constructive and destructive interference pattern and produce isolated vibrations, which may vary temporally, at predetermined portions of a handheld controller. The disclosure is applicable to haptic effects in a variety of applications in computer vision and image display systems, including augmented reality systems.

As an example, vibrations can be carried from the vibration source through the interior of the handheld controller to the housing of the handheld controller along several vibration paths. In some embodiments, the interior space between the vibration source and the housing is filled with a mechanical structure, for example, epoxy, that provides a vibration conductive path through the handheld controller. By controlling the vibration and phase of the vibration sources in the phased array emitter, it is possible to generate a steerable beam of vibration and create a spatially defined vibration on the housing, which can be felt by the user, selectively generating vibrations in different regions of the handheld controller as a result of the modulation of the vibration sources disposed internally in the handheld controller.

Thus, utilizing embodiments of the present disclosure, rather than vibrating the entire handheld controller, it is possible to direct vibrational energy outward from the vibration sources towards the housing or outer shell of the handheld controller, thereby generating localized vibrations, for example, vibrations selected and directed to different portions or parts of the housing of the handheld controller. In some embodiments, the internal structure of the handheld controller is such that vibrations travel substantially equally in all directions. In these embodiments, the phased array emitter is able to generate a steerable beam that can be felt at any position on the housing. In other embodiments, the housing is segmented into a plurality of vibratory external surfaces that are separated by a vibration damper, (e.g., including a vibration dampening material, and a plurality of structural members are utilized to mechanically couple vibrations from vibration source to the surface). The vibration source can include individual vibration sources mechanically coupled to the structural member and, thereby, to each of the plurality of vibratory external surfaces or a phased array emitter, which generates a steerable beam that is steered in a direction in order to couple the steerable beam to the structural member and, thereby, to each of the plurality of vibratory external surfaces.

In some embodiments, the housing is segmented into a plurality of vibratory external surfaces with a vibration damper disposed between each of the plurality of vibratory external surfaces. Thus, vibrations that reach the housing are limited in their ability to propagate along the housing from one region to another. The segmentation can be defined by the use of differing materials with differing stiffness or hardness, non-homogenous materials, spatial separation with intervening air gaps, or the like. Thus, embodiments include implementations in which the housing includes vibration isolated regions that are enabled to vibrate individually in a localized manner. Combinations of internal structure (e.g., structural members) and a segmented housing (e.g., vibration isolated regions) can be utilized in conjunction with one or more vibration sources, including phased array sources to enable a haptic user experience that is not available using conventional techniques.

According to an embodiment of the present disclosure, a handheld controller is provided. The handheld controller includes a housing, a first vibration source disposed in the housing and characterized by a first phase, and a second vibration source disposed in the housing and characterized by a second phase different than the first phase. The handheld controller also includes a controller disposed in the housing, coupled to the first vibration source and the second vibration source, and configured to vary at least one of the first phase or the second phase.

According to another embodiment of the present disclosure, a method of operating an array of haptic elements disposed in a handheld controller having a housing is provided. The method includes generating a first vibration using a first vibration source. The first vibration is characterized by a first phase. The method also includes generating a second vibration using a second vibration source. The second vibration is characterized by a second phase different from the first phase. The method further includes producing a combined vibration at an initial location on the housing.

According to a specific embodiment of the present disclosure, a handheld controller is provided. The handheld controller includes a housing comprising one or more external surfaces and a plurality of vibratory external surfaces. The handheld controller also includes a vibration source disposed in the housing, a vibration dampening material disposed between each of the plurality of vibratory external surfaces, and a plurality of structural members. Each of the plurality of structural members mechanically couple one of the plurality of vibratory external surfaces to the vibration source.

According to another specific embodiment of the present disclosure, a handheld controller is provided. The handheld controller includes a housing comprising a frame and a plurality of vibratory external surfaces. The handheld controller also includes a vibration damper disposed between each of the plurality of vibratory external surfaces, a plurality of vibration sources, each of the plurality of vibration sources being mechanically coupled to one of the plurality of vibratory external surfaces, and a controller coupled to each of the plurality of vibration sources.

In some embodiments, the housing also includes one or more external surfaces mechanically coupled to the frame. Each of the plurality of vibration sources can be mounted to one of the plurality of vibratory external surfaces. Each of the plurality of vibration sources can be mechanically coupled to the frame and the handheld controller can additionally include a plurality of structural members. Each of the plurality of structural members can mechanically couple each of the plurality of vibration sources to one of the plurality of vibratory external surfaces. The vibration damper can be an elastic band. Each of the plurality of vibratory external surfaces can include a periphery and the vibration damper can surround each of the plurality of vibratory external surfaces at the periphery.

Numerous benefits are achieved by way of the present disclosure over conventional techniques. For example, embodiments of the present disclosure provide methods and systems that enable enhanced control over haptic effects in handheld controllers. For instance, one or more phased arrays of vibration sources can be positioned and controlled to emit steerable beams of vibrational energy that can be used to generate vibrations on predetermined portions of a housing of a handheld controller. This ability to create localized vibration patterns on the housing of a handheld controller may be used to create haptic effects that are not possible with previous approaches, such as the sensation of touch or pressure on only one region of a user's hand, or a traveling sensation that changes location on the user's hand over some time period (and possibly in response to the user's input). This can also be used to segment different haptic effects for different user experience purposes: vibrations at the bottom of the controlled might be used for system indications and alerts, while vibrations at the top of the controller near the more sensitive touch receptors in a user's fingers might be given over to application control; traveling vibrations might be segmented by pattern, with one pattern alerting the user to a new email, while another pattern alerts the user to a low battery; and even the physical extent of a vibration might be used to indicate information to the user with a very tightly localized and weak vibration pattern alerting the user to something that is not very urgent (maybe a 50% battery indication), while a large vibration pattern over the entire device might alert the user to something that is very urgent (a 5% battery indication). These and other embodiments of the disclosure along with many of its advantages and features are described in more detail in conjunction with the text below and attached figures.

DETAILED DESCRIPTION OF SPECIFIC EMBODIMENTS

The present disclosure relates to virtual reality and/or augmented reality imaging and visualization systems. The present disclosure relates generally to methods and systems related to haptic effects in handheld devices. In some particular embodiments, a phased array emitter is utilized to produce isolated vibrations, which may vary temporally, at predetermined portions of a handheld controller. The disclosure is applicable to haptic effects in a variety of applications in computer vision and image display systems, including augmented reality systems.

As described herein, embodiments of the present disclosure utilize a set of vibration sources, also referred to as haptic elements, that are arranged in a geometric relationship to each other such that control of the phase delays between the set of vibration sources can generate a beam of vibratory energy that can be steered to arbitrary positions on the surface of a handheld controller.

In an augmented reality (AR) system, the AR system can be designed to be interactive with a user. As an example, the user may be provided with a handheld controller, also referred to as a totem, that the user can utilize to interact with the AR system. The handheld controller can utilize one of several mechanisms to provide feedback, information, directions, or the like with the user. For example, vibration of particular portions of the handheld controller, either in an independent, sequential, or concurrent manner can be utilized to enhance the user experience.

Figure 1A:
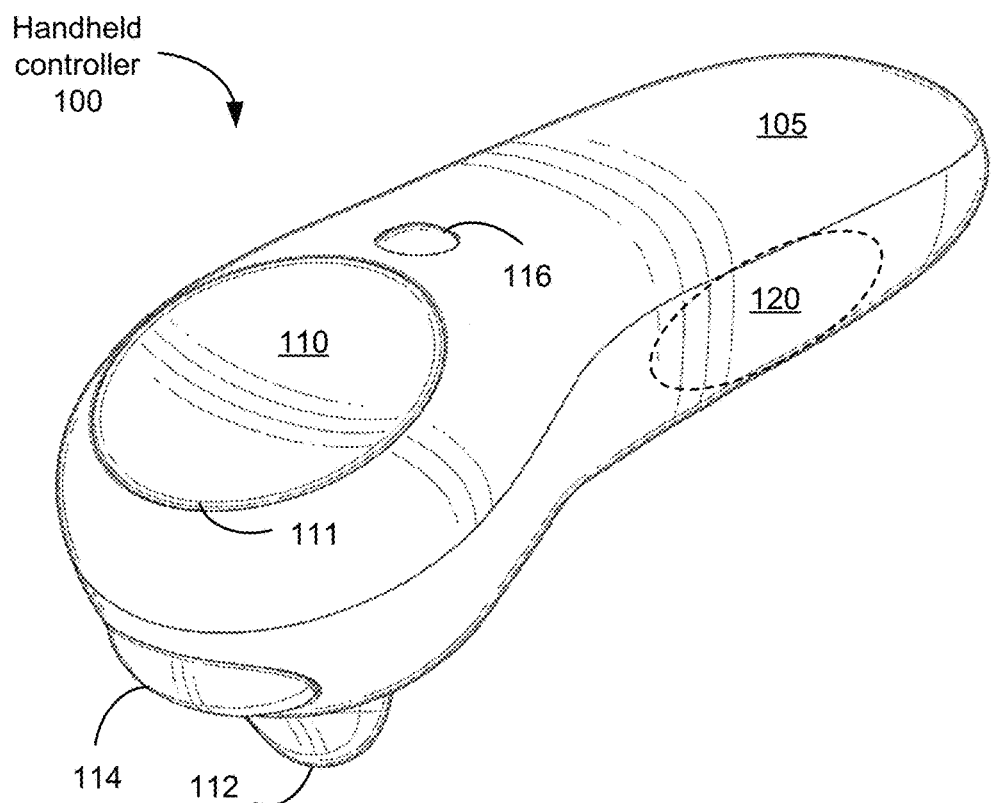
FIG. 1A schematically illustrates a perspective view of a handheld controller, according to some embodiments.

FIG. 1A schematically illustrates a perspective view of a handheld controller, according to some embodiments. As illustrated in FIG. 1A, handheld controller 100 can include a housing 105 in which electronics, communications units, and one or more vibration sources (not shown) can be disposed. The surfaces of housing 105 of handheld controller 100 can be segmented to provide individual elements, including touch pad 110, finger trigger 112, bumper 114, button 116, and the like. As described more fully herein, the individual elements, for example, touch pad 110, can be mechanically isolated from other individual elements and housing 105 using vibration dampening materials 111. Although only illustrated in relation to touch pad 110, it will be appreciated that other individual elements can be mechanically isolated using suitable vibration dampening materials. In one use case, the user holds handheld controller 100 with the right hand, positioning the thumb adjacent to button 116 and the index finger adjacent to trigger 112.

Although in some embodiments, handheld controller 100 can be held in a hand of a user, handheld controller 100 can also be mounted to a hand or arm of the user (e.g., as a ring or bracelet or as part of a glove worn by the user). In some embodiments, handheld controller 100 may be a totem, for example, to be used in a gaming scenario (e.g., a multi-degree-of-freedom controller) or to provide a rich user experience in an AR environment or to allow user interaction with an AR system. As described herein, handheld controller 100 integrates haptic effects and is a haptic device.

Integration of one or more vibrations sources with handheld controller 100 can be accompanied by inclusion of a battery or other power supply that can provide power to the one or more vibration sources, for example, a phased array emitter as discussed more fully in the description that follows. Additionally, other elements can be included in handheld controller 100, including controllers, communications devices, inertial motion units (IMUs), and the like.

Figure 1B:
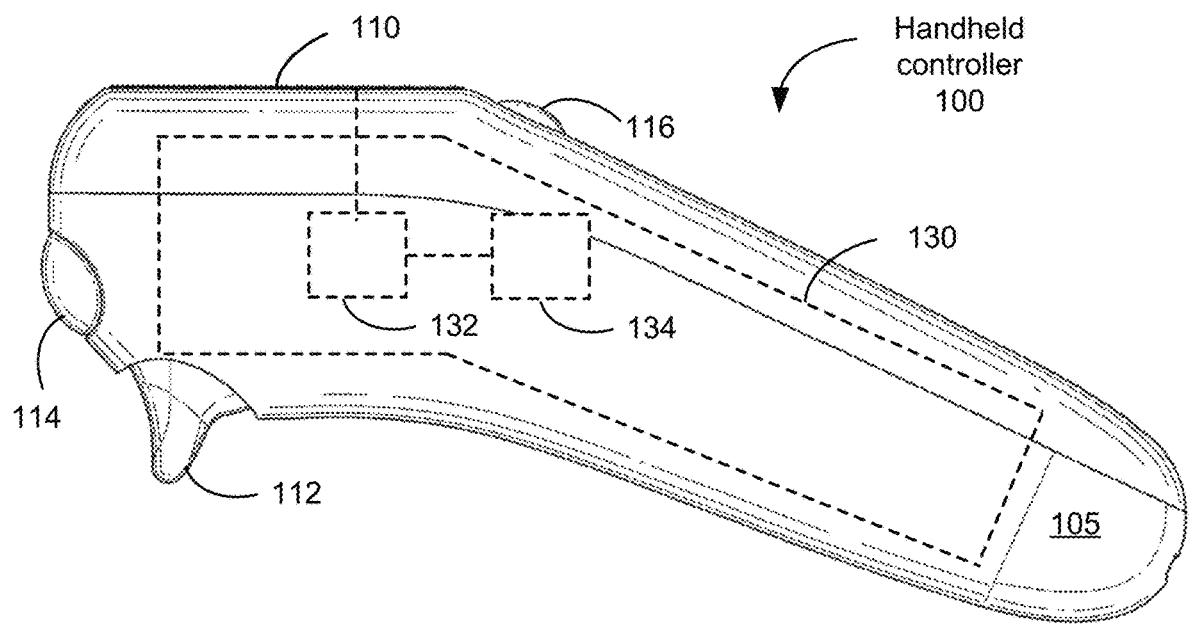
FIG. 1B schematically illustrates a side view of a handheld controller, according to some embodiments.

FIG. 1B schematically illustrates a side view of a handheld controller, according to some embodiments. The description provided in relation to FIG. 1A is applicable to FIG. 1B as appropriate. The surfaces of housing 105 of handheld controller 100 include individual elements including touch pad 110, finger trigger 112, bumper 114, and button 116. The handheld controller includes an internal frame 130 that is illustrated by dashed lines because it is positioned inside housing 105. Frame 130 provides mechanical support for housing 105 as well as the individual elements of the handheld controller. Vibration source 132 is disposed inside housing 105 and is mechanically coupled to frame 130 and is controlled by controller 134, which can be a microprocessor coupled to a memory, or the like. As an example, in order to actuate touch pad 110, vibration source 132 can be actuated by controller 134 to transmit a beam of vibrational energy as described in relation to FIG. 2B, transmit vibrational energy via a structural member as described in relation to FIG. 4, or the like.

Figure 2A:
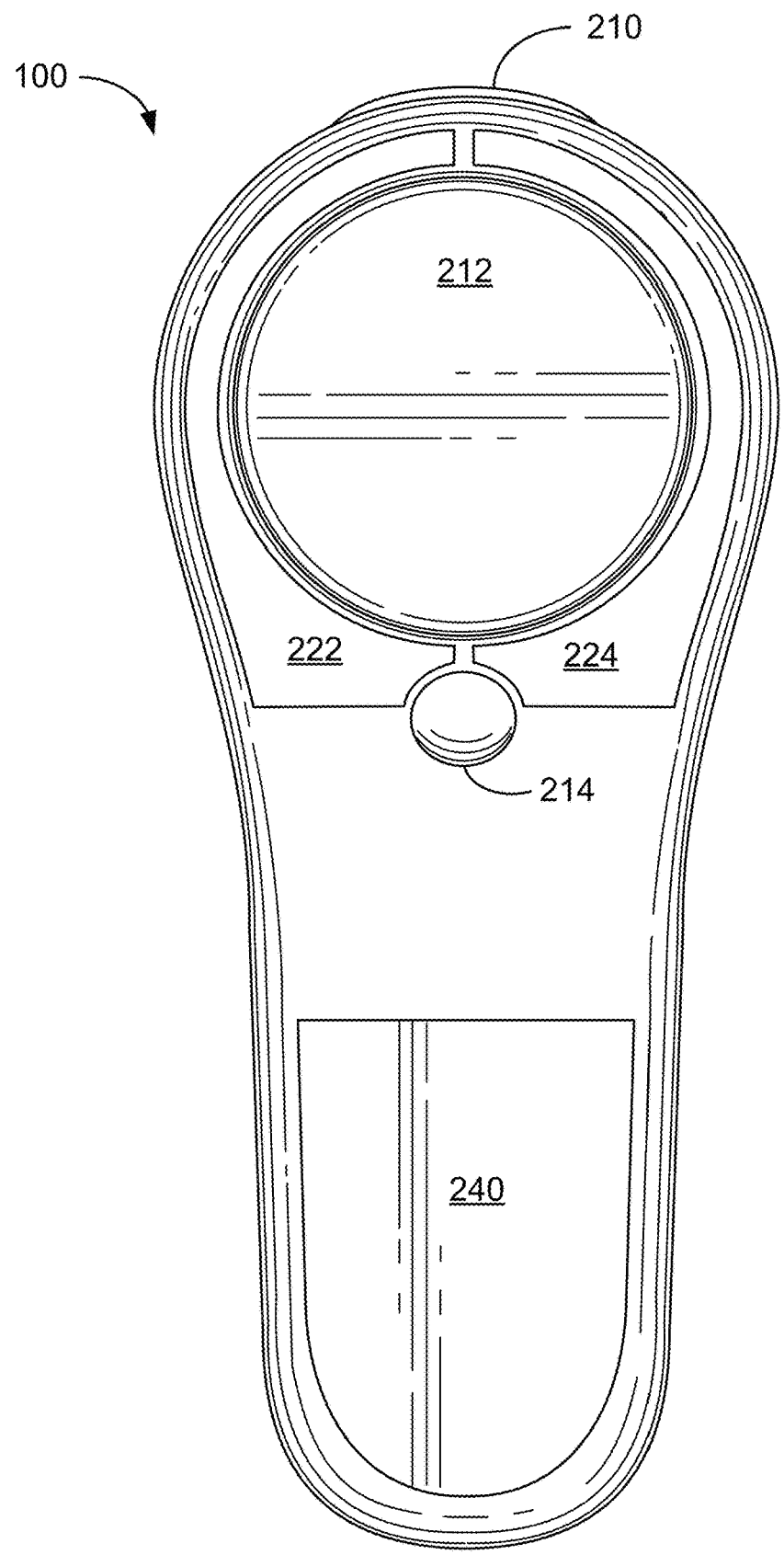
FIG. 2A schematically illustrates a plan view of a handheld controller with multiple haptic regions, according to some embodiments.

FIG. 2A schematically illustrates a plan view of a handheld controller with multiple haptic regions, according to some embodiments. As illustrated in FIG. 2A, handheld controller 100 includes a plurality of distinct external surfaces, some of which are vibratory external surfaces and some of which are fixed. Thus, haptic effects can be generated on some regions of the housing (which can be referred to as vibratory regions) independent from other regions of the housing. In the illustrated embodiment, bumper 210, which is illustrated as bumper 114 in FIGS. 1A and 1B, left peripheral section 222, right peripheral section 224, touch pad 212, and vibratory plate 240 are vibratory external surfaces that are isolated from adjacent regions. Button 214, which is illustrated as button 116 in FIGS. 1A and 1B, is also illustrated. Thus, as described herein, in some embodiments, vibratory regions of the housing that are designed to transmit vibrations from a vibration source to a user are surrounded by other regions of the housing that isolate the vibratory regions from each other. This structure enables selective control of the haptic effects that improve the user experience.

The number and position of the vibratory external surfaces are not limited to this specific example and the illustrated vibratory external surfaces (e.g., bumper 210, left peripheral section 222, right peripheral section 224, touch pad 212, and vibratory plate 240) are shown merely by way of example. Accordingly, a greater or lesser number of vibratory external surfaces as well as vibratory external surfaces of differing shape and size are included within the scope of the present disclosure. The vibratory external surfaces can be vibration isolated from other portions of the housing such that vibration of one of the vibratory external surfaces does not result in vibration of another of the vibratory external surfaces or vibration of other fixed portions of the housing. One of ordinary skill in the art would recognize many variations, modifications, and alternatives.

Figure 3A:
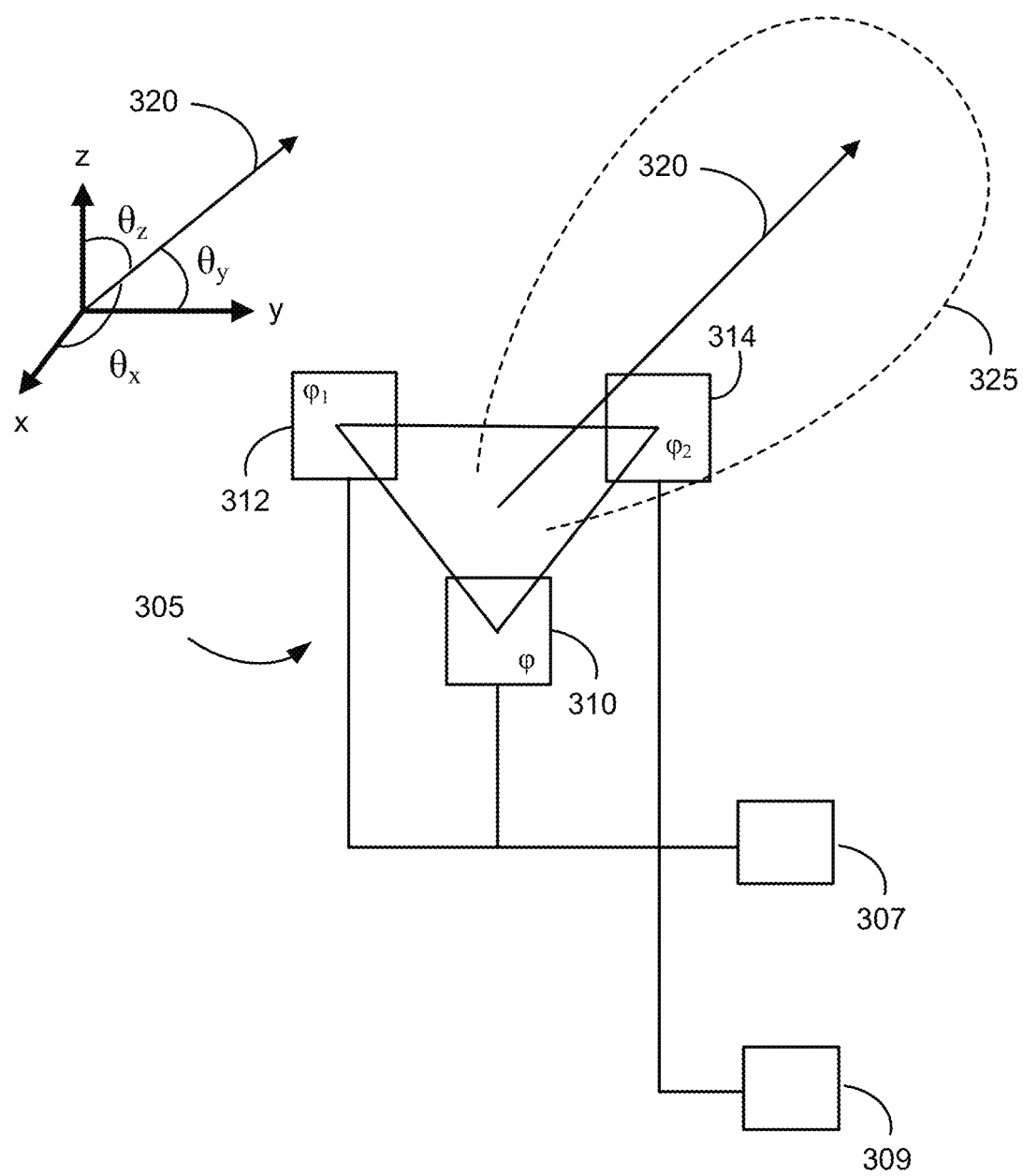
FIG. 3A schematically illustrates a set of three vibration sources generating a steerable beam at a predetermined angle, according to some embodiments.
Figure 3B:
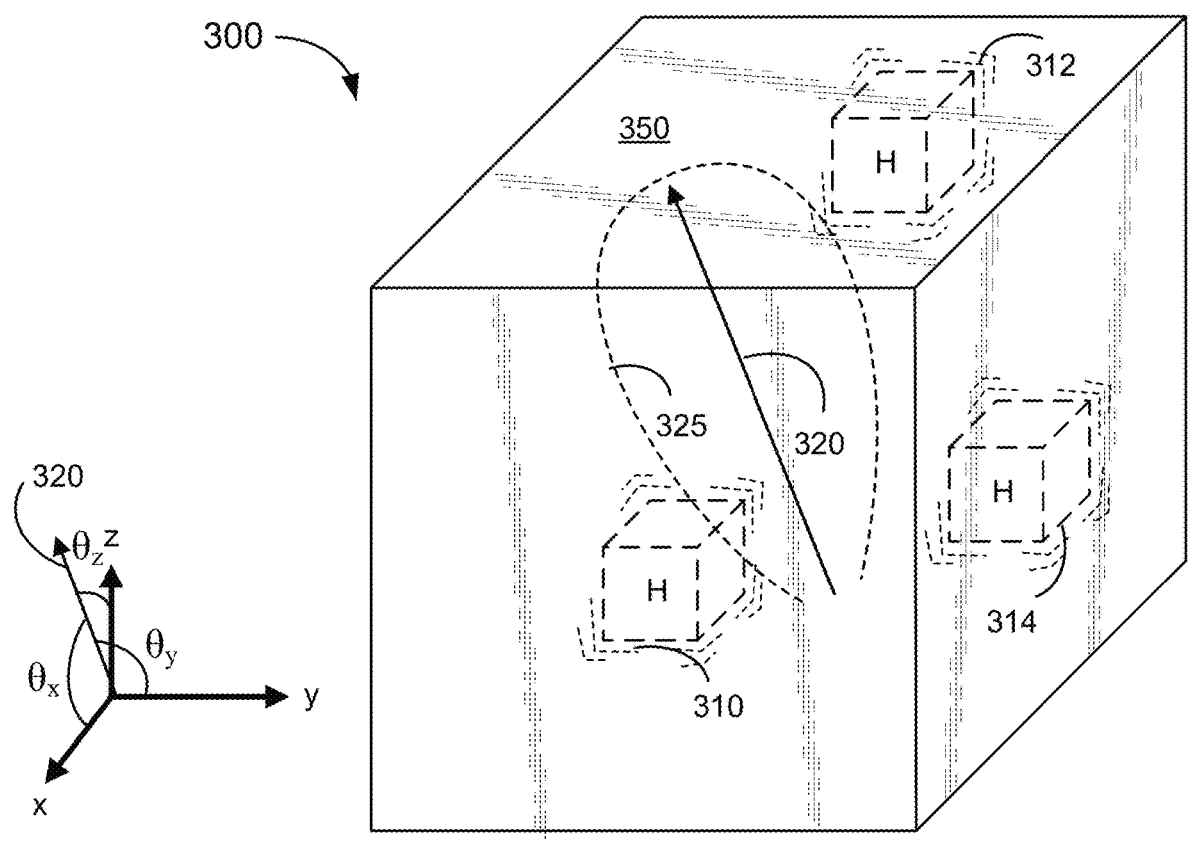
FIG. 3B schematically illustrates the set of three vibration sources illustrated in FIG. 3A disposed in a handheld controller, according to some embodiments.

In some embodiments, the vibratory external surfaces are actuated using steerable beams of vibratory energy as described herein, for example, with reference to FIGS. 3A and 3B. In other embodiments, the vibratory external surfaces are actuated using structural members as described herein, for example, with reference to FIG. 4.

Figure 2B:
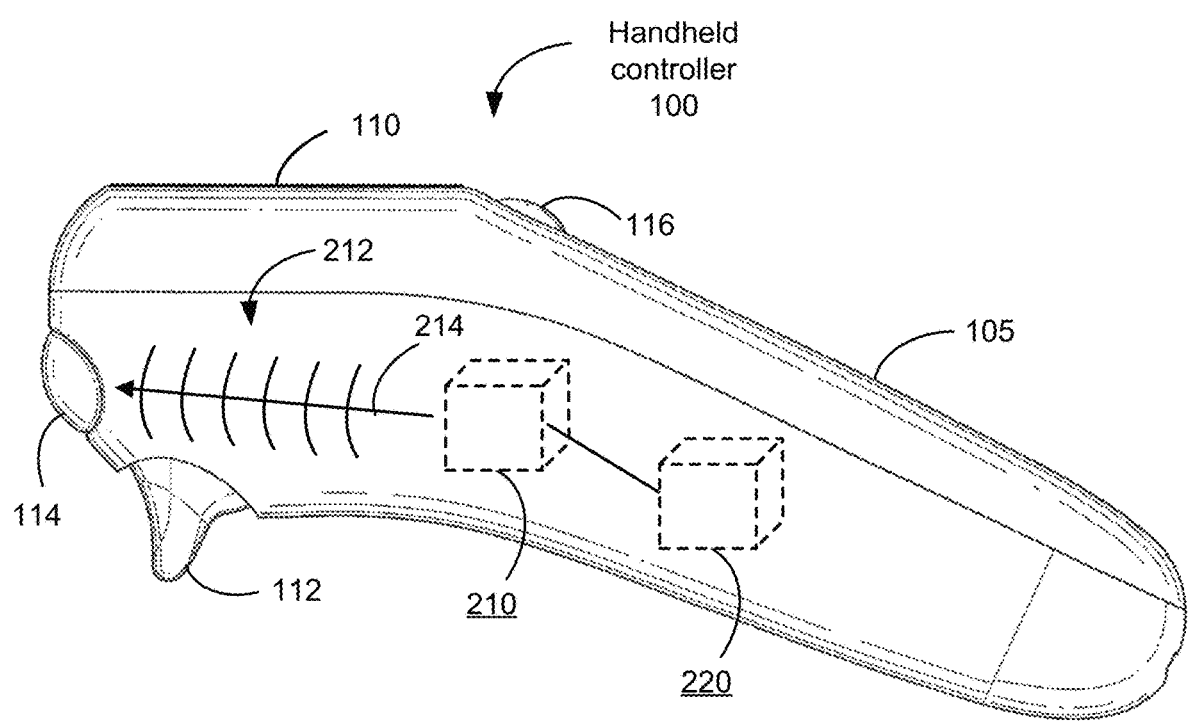
FIG. 2B schematically illustrates a cross-sectional view of a handheld controller including a phased array emitter, according to some embodiments.

FIG. 2B schematically illustrates a cross-sectional view of a handheld controller including a phased array emitter, according to some embodiments. In order to generate directed vibrational beams, phased array emitter 210 is incorporated as an element of and positioned inside housing 105 of handheld controller 100. As illustrated in FIG. 2B, phased array emitter 210 emits a steerable beam of vibratory energy 212 that is directed along a direction represented by directional vector 214. In the illustrated embodiment, beam of vibratory energy 212 is directed to impinge on bumper 114, but this is not required by the present disclosure. As described herein, beam of vibratory energy 212 can be steered to impinge on other portions or regions of the housing, for example, touch pad 110, finger trigger 112, button 116, specific regions on housing 105, or the like.

It should be appreciated that phased array emitter 210 may also include or be coupled to IMU 220, which may be configured to assist in communicating feedback and/or information to the user of handheld controller 100. As an example, as the user moves the handheld controller to the left, a vibratory beam could be directed to region 120 illustrated in FIG. 1A on the left side of the housing of handheld controller 100. Alternatively, as the user moves the handheld controller to the right, a vibratory beam could be directed to a matching region on the right side of housing 105 of handheld controller 100 that opposes region 120 on the left side of housing 105 of handheld controller 100. Moreover, left peripheral section 222 and right peripheral section 224 can be operated in conjunction with region 120 and the matching region. Thus, as the user moves the handheld controller to the left, the vibratory beam could be swept to actuate right peripheral region 224, then left peripheral region 222, then settle on region 120, sweeping to the left side of the handheld controller in conjunction with the motion of the handheld controller by the user. Similarly, as the user moves the handheld controller to the right, the vibratory beam could be swept to actuate left peripheral region 222, then right peripheral region 224, then settle on the matching region on the right side of housing 105, sweeping to the right side of the handheld controller in conjunction with the motion of the handheld controller by the user.

FIG. 3A schematically illustrates a set of three vibration sources generating a steerable beam at a predetermined angle, according to some embodiments. As illustrated in FIG. 3A, three-phased array vibration sources 310, 312, and 314 are included as elements of a phased array emitter 305, which is disposed in a handheld controller 100 (e.g., phased array emitter 210 in FIG. 2B). In some embodiments, each of phased array vibration sources 310, 312, and 314 can be a haptic device operated at a predetermined frequency (e.g., in the range of 10 Hz-10 kHz) such that each haptic device generates a vibratory field. The phased array vibration can include or utilize piezoelectric actuators, linear resonant actuators, eccentric rotating mass actuators, or the like.

In the exemplary phased array emitter 305 illustrated in FIG. 3A, all of the phased array vibration sources 310, 312, and 314, which can also be referred to as haptic elements, are disposed in a single plane, for example, in the y-z plane. Generally, the relative orientation and arrangement of the phased array vibration sources 310, 312, and 314 is selected so that a main lobe produced by the constructive interference of the vibratory fields emitted by the vibration sources is directed along the direction pointing toward the most common portion of the handheld controller at which the user will experience the resulting haptic effect. Merely by way of example, the main lobe direction is illustrated in FIG. 3A by emitted beam 320 oriented at beam angle $\theta$, which includes components $\theta_x$, $\theta_y$, and $\theta_z$ aligned with the x-axis, y-axis, and z-axis, respectively.

As vibratory fields are emitted by each of phased array vibration sources 310, 312, 314, the wave nature of the vibratory fields results in interference between the individual vibratory fields emitted by the phased array vibration sources 310, 312, and 314. This interference produces regions of constructive interference and regions of destructive interference. For phased array vibration sources 310, 312, and 314 illustrated in FIG. 3A, if the phase of each element is aligned (i.e., no delay between elements), a main lobe will be produced along the x-direction orthogonal to the plane of the figure. If a fixed phase delay relationship is implemented between the phased array vibration sources (i.e., phased array vibration source 310 having phase delay $\varphi$, which may be zero, phased array vibration source 312 having phase delay (pi, and phased array vibration source 314 having phase delay $\varphi_2$), the interference between phased array vibration sources 310, 312, and 314 will result in generation of a main lobe 325, as well as side lobes (not illustrated in FIG. 3A for purposes of clarity). In some embodiments, phased array vibration sources 310, 312, and 314 will be positioned such that the y-z plane illustrated in FIG. 3A will be orthogonal to the beam angle $\theta$ illustrated in FIG. 3A in order to generally align the main lobe produced using no phase delays with the direction pointing toward the most common portion of the handheld controller at which the user will experience the resulting haptic effect. Although three phased array vibration sources are illustrated in FIG. 3A, embodiments of the present disclosure are not limited to this particular number and other numbers, including two phased array vibration sources and more than three phased array vibration sources can be utilized by embodiments of the present disclosure.

Thus, although phased array vibration sources 310, 312, and 314 are static (i.e., their position in the handheld controller is fixed), control of the phase delay associated with each phased array vibration source can enable steering of main lobe 325. As illustrated in FIG. 3A, main lobe 325 is centered on vector 320, which is oriented at a beam angle $\theta$ having components $\theta_x$, $\theta_y$, and $\theta_z$ along the x-axis, y-axis, and z-axis, respectively. Vector 320 can be referred to as a central vector since it is aligned with the center of the main lobe. By modifying the phase delays $\varphi$, $\varphi_1$, and/or $\varphi_2$, main lobe 325 can be steered such that vector 320 can be oriented at an arbitrary beam angle $\theta$. Although only the phase delays $\varphi_1$ and/or $\varphi_2$, corresponding to phased array vibration sources 312 and 314, are modified in some embodiments, it will be appreciated that phase delay $\varphi$ associated with phased array vibration source 310 can also be modified or controlled to result in control over the beam angle $\theta$ associated with main lobe 325. Thus, when phase delay $\varphi$ is utilized, all three phase delays can be controlled to achieve the desired phase delays between phased array vibration sources 310, 312, and 314. One of ordinary skill in the art would recognize many variations, modifications, and alternatives.

As illustrated in FIG. 3A, controller 307 is electrically coupled to vibration sources 310, 312, and 314, enabling control of the amplitude and phase of the vibrations produced using vibration sources 310, 312, and 314. The controller can include hardware elements that may be electrically coupled via a bus, the elements including, for example, at least one central processing unit ("CPU"), at least one input device (e.g., the individual elements illustrated in FIG. 1A), and at least one output device (e.g., a display device or speaker). Controller 307 may also include one or more storage devices, such as disk drives, optical storage devices, and solid-state storage devices, including, for example, random access memory ("RAM") or read-only memory ("ROM"), as well as removable media devices, memory cards, flash cards, etc.

Controller 307 can include or be in communication with a communications device (e.g., a modem, a network card (wireless or wired)), an infrared communication device, etc.) in order to communicate with devices external to the handheld controller. In order to provide power to controller 307 and vibration sources 301, 312, and 314, a power source 309 is provided, for example, inside housing 105. Power source 309 can be implemented as a rechargeable battery or the like.

FIG. 3B schematically illustrates the set of three vibration sources illustrated in FIG. 3A disposed in a handheld controller, according to some embodiments. In FIG. 3B, handheld controller 300 is illustrated as a geometric shape in the form of a cube for purposes of clarity. However, it will be appreciated that embodiments of the present disclosure are not limited to this cubic shape and implementation in the form of handheld controller 100 illustrated in FIGS. 1A, 1B, 2A, and 2B are included within the scope of the present disclosure.

Referring to FIG. 3B, phased array vibration sources 310, 312, and 314 are positioned at predetermined positions inside handheld controller 300. These predetermined positions can be measured in relation to the illustrated Cartesian coordinate system. Assuming that the handheld controller 300 is filled with a material that will support the propagation of vibratory oscillations in all directions, i.e., vibration conducting material, such as epoxy, actuation of phased array vibration sources 310, 312, and 314 with a defined phase delay relationship between each of phased array vibration sources 310, 312, and 314, (i.e., phased array vibration source 310 having phase delay φ, which may be zero, phased array vibration source 312 having phase delay $φ_1$, and phased array vibration source 314 having phase delay $φ_2$), the interference between phased array vibration sources 310, 312, and 314 will result in generation of a main lobe 325 centered on vector 320 as discussed in relation to FIG. 3A. Thus, phased array vibration sources 310, 312, and 314, in conjunction with the vibration pathways provided inside handheld controller 300 as a result of the material filling handheld controller 300, enable both generation and control of steerable main lobe 325. In some embodiments, a vibration conducting material that transmits vibrations (e.g., phonons) with reduced or minimal losses or attenuation is utilized to conduct vibrations from the one or more vibration sources to external vibratory materials. The vibration conducting material can be solid, rigid, or otherwise suitable for conducting vibrations.

Although three phased array vibration sources are disposed in handheld controller 300 as illustrated in FIG. 3B, embodiments of the present disclosure are not limited to this particular number and other numbers, including two phased array vibration sources and more than three phased array vibration sources can be utilized by embodiments of the present disclosure. As an example, larger arrays of phased array vibration sources, for example, three dimensional arrays of phased array vibration sources, for instance a 3×3×3 array, a 5×5×5 array, or a 10×10×10 array could be utilized to form more focused beams of vibrational energy. In some embodiments, a plurality of structures such as that illustrated in FIG. 3B can be combined in a single handheld controller, thereby implementing multiple phased array emitters (each including multiple phased array vibration sources) inside a single handheld controller. One of ordinary skill in the art would recognize many variations, modifications, and alternatives.

Figure 3C:
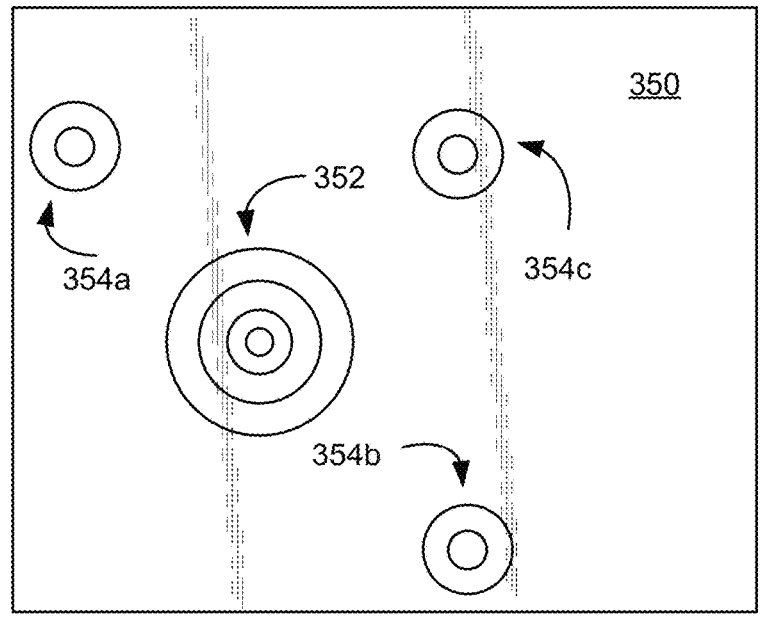
FIG. 3C schematically illustrates standing waves formed on a surface of a handheld controller, according to some embodiments.

FIG. 3C schematically illustrates standing waves formed on a surface of a handheld controller, according to some embodiments. As illustrated in FIG. 3A, main lobe 325 is directed towards top surface 350 of handheld controller 300 and produces standing waves that form on top surface 350. Thus, considering the individual elements of handheld controller 100 illustrated in FIG. 2A, the standing waves illustrated in FIG. 3C can be formed on bumper 210, touch pad 212, left peripheral section 222, right peripheral section 224, vibratory plate 240, or button 214. Thus, the discussion provided in relation to top surface 350 should be understood to apply to the surfaces of the handheld controller, including mechanically isolated individual elements, portions of the housing, as illustrated by region 120, or the like.

Referring to FIG. 3C, a peak vibration 352, illustrated as a topographical profile to demonstrate how the vibrations decrease as the distance (measured in the plane of surface 350) from vector 320 increases, is produced on top surface 350. In addition to vibrations on top surface 350 produced by main lobe 325, side lobes may be present and are illustrated as producing subsidiary vibrations 354a, 354b, and 354c. In a manner similar to peak vibration 352, subsidiary vibrations 354a, 354b, and 354c are illustrated as topographical profiles to demonstrate how the vibrations decrease as the distance from the vector associated with the center of each side lobe increases. Although vibrations 354a, 354b, and 354c associated with side lobes are illustrated in FIG. 3C, this is not required by the present disclosure and other implementations will design the beam generation to reduce or eliminate the presence of side lobes. As will be evident to one of skill in the art, the physical distance between the vibration sources (e.g., phased array vibration sources 310, 312, and 314), the materials between the vibration sources, and the operating frequencies and phase delays will impact the position, orientation, and direction of the steerable beam(s) of vibrational energy.

Although top surface 350 is illustrated as having a square shape for purposes of clarity, it will be appreciated that the various surfaces of handheld controller 300 can be designed to utilize particular shapes that will support particular classes of standing waves. Moreover, Chladni patterns can be formed by varying the oscillation frequency of the vibration sources, implementing different vibration patterns that can be formed on the surface of interest and supplement the beam steering functionality.

Because embodiments of the present disclosure utilize control of phase delays to implement steerability of the beam of vibrational energy, benefits not available using conventional haptic elements are achieved. As an example, specific portions or regions of the housing of the handheld controller can be actuated as the beam of vibrational energy is steered. The beam steering can result in continuous motion of the peak vibration or discontinuous motion of the peak vibration. Referring to FIG. 1A, the beam of vibrational energy can be steered to region 120 on the left side of handheld controller 100 for a predetermined time period and then discontinued and reestablished on touch pad 110 for a second predetermined time period. Moreover, because the beam can be steered rapidly in comparison with a user's reaction times, a beam of vibrational energy can be steered to region 120 on the left side of handheld controller 100 during a first time period (first 10 ms) and then steered to touch pad 110 during a second time period (second 10 ms). This pattern can then be repeated during the next time periods (region 120 during 20-30 ms and touch pad 110 during 30-40 ms) to simulate vibration generation at two locations concurrently. One of ordinary skill in the art would recognize many variations, modifications, and alternatives.

Figure 3D:
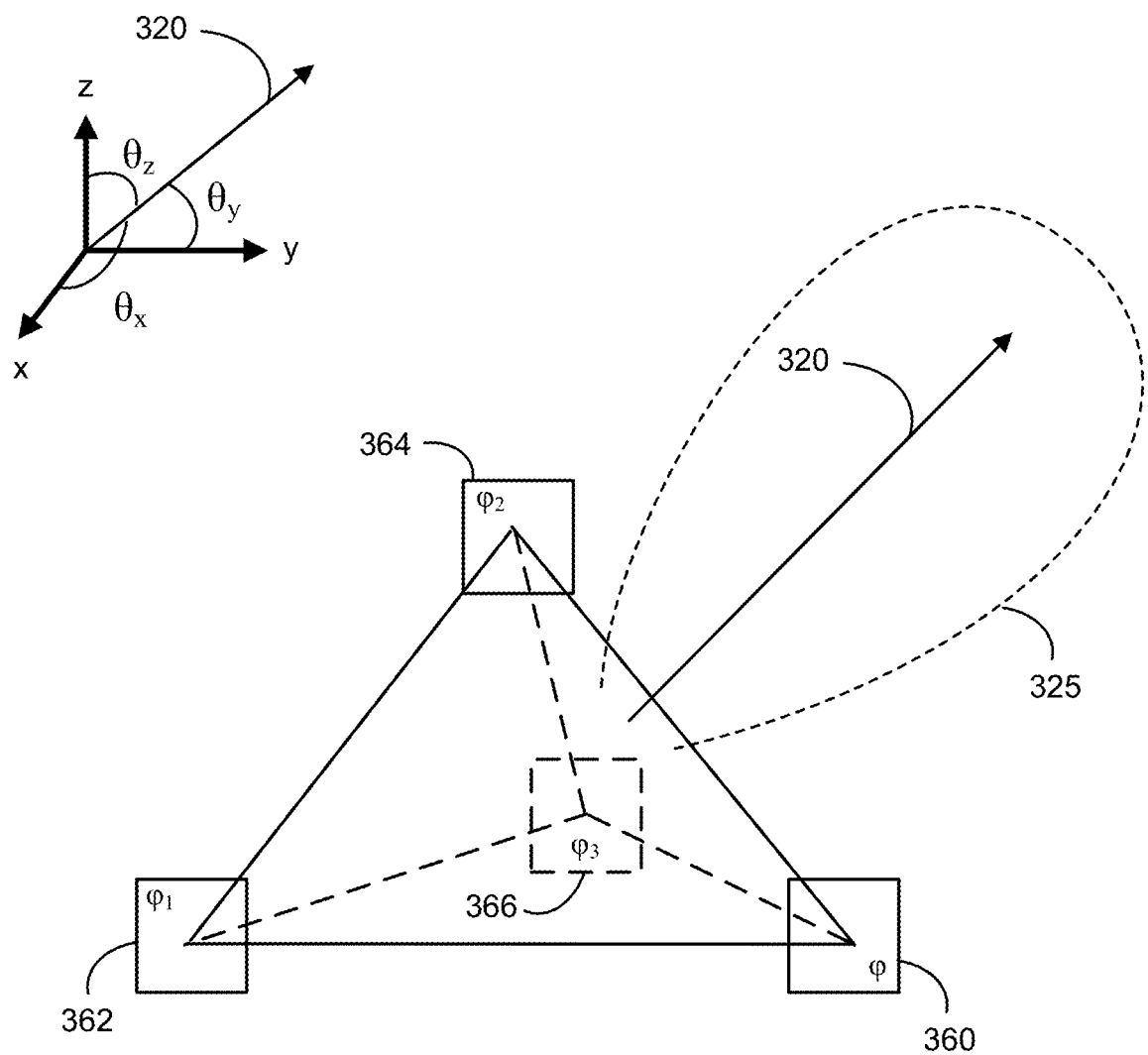
FIG. 3D schematically illustrates a set of four haptic elements in a tetrahedral arrangement, according to some embodiments.

FIG. 3D schematically illustrates a set of four vibration sources in a tetrahedral arrangement, according to some embodiments. As illustrated in FIG. 3D, four phased array vibration sources 360, 362, 364, and 366 are positioned to lie on the four vertices of a tetrahedron. Phased array vibration sources 360, 362, and 364 lie in the y-z plane while phased array vibration source 366 is positioned at a predetermined height above the y-z plane measured along the x-axis. By utilizing the tetrahedral arrangement illustrated in FIG. 3D, additional control is provided over the beam shape of the main lobe 325 as well as increased control for beam steering in the y-z plane.

As discussed above, for beam forming technologies, the beam pattern (e.g., main lobe width) and control of the directionality of the steered beam for phased arrays is a function of the number and position of the vibration sources in the array. Generally, as described below, the maximum main lobe intensity is formed perpendicular to the plane of the vibration sources. As an example, if two vibration sources are utilized, the symmetry of the two vibration sources will enable beam generation in a plane perpendicular to the line joining the two vibration sources and positioned half way between the perpendicular bisector of the two vibration sources.

As additional vibration sources are utilized, for example, three vibration sources, beam steering in two dimensions is enabled. The maximum intensity of the main lobe will be at a position perpendicular to the plane in which the three vibration sources lie. Referring to FIG. 3A, the maximum intensity would be centered on the three vibration sources and lie above or below the plane of the figure. As the beam is steered toward positions having small x-dimensions, control is reduced.

In the tetrahedral arrangement illustrated in FIG. 3D, the four faces of the tetrahedron provide enhanced control in comparison with the three vibrations sources illustrated in FIG. 3A. Referring to FIG. 3D, vibration sources 360, 362, and 364 lie in the y-z plane and provide for effective beam steering in directions having components perpendicular to the y-z plane, i.e., above and below the plane of the figure. The three other faces of the tetrahedron provide three normals along which beam forming can produce steered beams with maximum intensities, thereby providing a high level of three dimensional control. As an example, emitted beam 320 of main lobe 325 is illustrated as normal to the face of the tetrahedron defined by vibration sources 360, 364, and 366, thereby providing a high level of control in the direction of emitted beam 320 as well as the direction opposite to the direction of emitted beam 320. Similarly, an emitted beam can be illustrated as normal to the face of the tetrahedron defined by vibration sources 360, 362, and 366, thereby providing a high level of control in the direction generally aligned with the x-axis, and an emitted beam can be illustrated as normal to the face the tetrahedron defined by vibration sources 362, 364, and 366. Emitted beams in the direction opposite to the exterior normal of the faces of the tetrahedrons can also be generated.

Although FIGS. 3A and 3D illustrate three and four vibration sources, embodiments of the present disclosure are not limited to these particular numbers of vibration sources and arrays including additional vibration sources can be utilized. As the number of vibration sources in the phased array increases, the symmetry of the array, as viewed from different directions, increases. Thus, the four-fold symmetry of the tetrahedron can be increased to higher levels of symmetry using additional vibration sources to increase the control available in three dimensions. Thus, Platonic solids as well as non-Platonic solids with vibration sources at a plurality of vertices can be utilized according to embodiments of the present disclosure to provide additional faces suitable for projection in perpendicular directions.

In some embodiments, internal structures present inside the handheld controller, for example, printed circuit boards, a battery, electrical connectors, or the like may result in an internal structure that could impede propagation of beams of vibrational energy or impede steering of a beam of vibrational energy, which could, therefore, present challenges to producing a standing wave, for example, peak vibration 352 at desired regions on the housing of the handheld controller.

Figure 4:
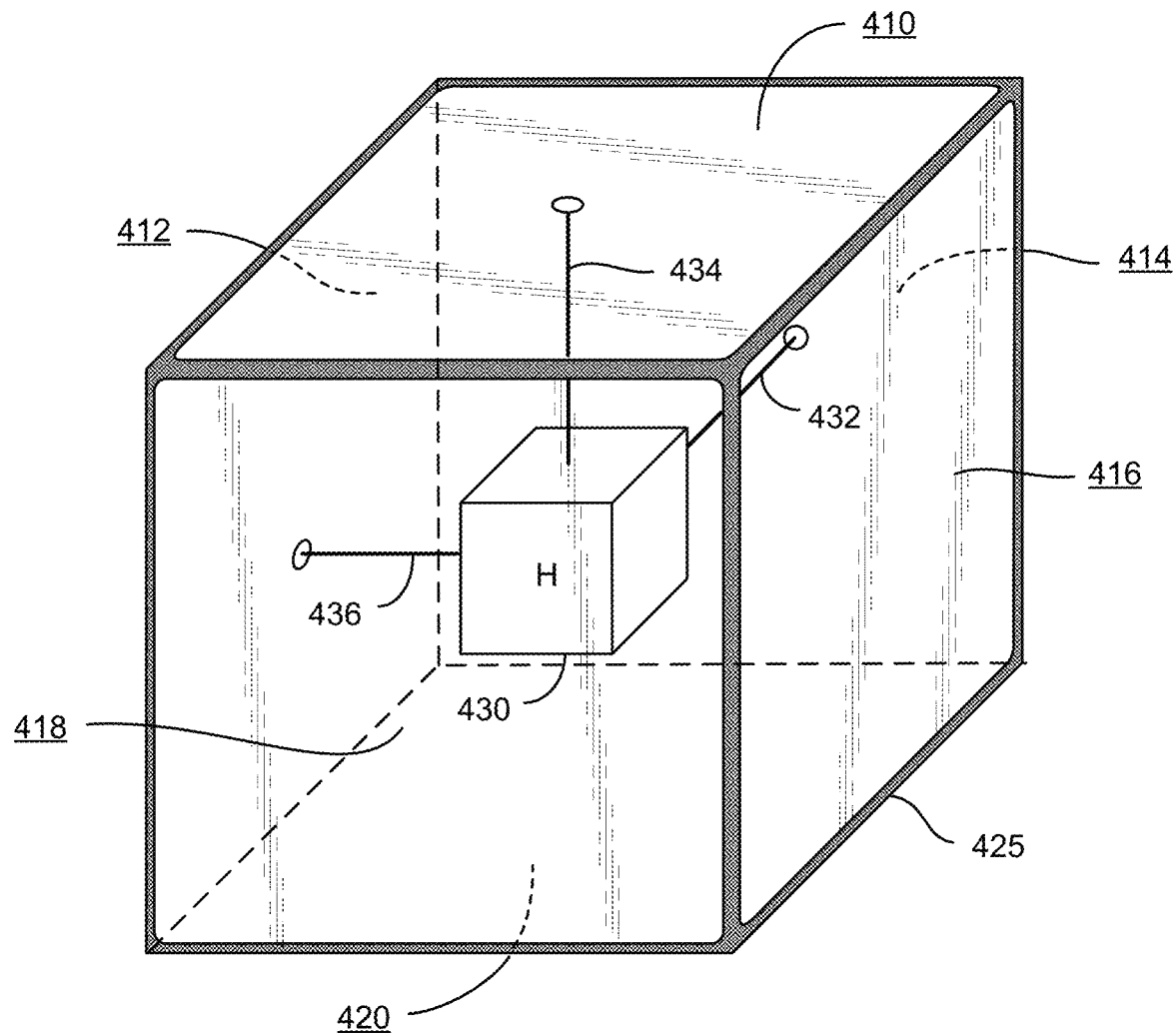
FIG. 4 schematically illustrates a haptic element with rigid supports to vibration isolated surfaces, according to some embodiments.

FIG. 4 schematically illustrates a haptic element with rigid supports to vibration isolated surfaces, according to some embodiments. Referring to FIG. 4, the external surfaces of handheld controller 400 are illustrated as six faces of a cube for purposes of clarity. However, it will be appreciated that embodiments of the present disclosure are not limited to this cubic shape and implementation in the form of handheld controller 100 illustrated in FIGS. 1A, 1B, 2A, and 2B are included within the scope of the present disclosure.

Each of the external surfaces of handheld controller 400, represented by top face 410, left face 412, back face 414, and right face 416, front face 418, and bottom face 420 are separated by a vibration dampening material 425, for example, foam, rubber, silicone, PDMS, cork, fabric, or the like. In some embodiments, each of the vibratory external surfaces has a periphery and the vibration dampening material that is disposed between each of the plurality of vibratory external surfaces can be an elastic band that is attached to and surrounds each of the plurality of vibratory external surfaces at the periphery. In other embodiments, vibration dampening material 425 can be positioned on the interior surface of the vibratory external surfaces. Thus, the vibratory external surfaces are able to vibrate independently from each other, thereby providing a plurality of independent vibratory external surfaces.

In some embodiments, all of the external surfaces are vibratory surfaces, whereas in other embodiments, some of the external surfaces are fixed to other elements of the handheld controller, for example, mechanically coupled to a frame of the handheld controller, and some of the external surfaces are vibratory external surfaces. Referring to FIG. 2A, bumper 210, left peripheral section 222, right peripheral section 224, and vibratory plate 240 are vibratory external surfaces. In the simplified handheld controller 400 illustrated in FIG. 4, top face 410, left face 412, and back face 414 are vibrational external surfaces, which can be correlated to the vibratory external surfaces illustrated, for example, in FIG. 2A.

A vibration source 430, which may also be referred to as a vibratory oscillator, is disposed in handheld controller 400 and is mechanically coupled to an optional frame. In some embodiments, vibration source 430 is anchored to one or more components in the handheld controller. As an example, mounting pads could be utilized to anchor vibration source 430. As another example, vibration source 430 could be coupled to an internal foam structure, a frame section of the handheld controller, or the like. In other embodiments, vibration source is only mounted to the external vibration surfaces, i.e., top face 410, left face 412, and back face 414. As illustrated in FIG. 4, vibration of vibration source 430, which can be considered as a motion of the center of mass of the vibration source, can be conducted through structural members to external vibration surfaces as described more fully below.

Depending on the nature of the vibration source, the vibrations may be generated in preferential directions. As an example, for a linear resonant actuator, the vibration will be preferentially generated along a linear direction, which may be aligned with one of the structural members in order to direct the vibrations to the desired external vibration surface. For an eccentric rotating mass actuator, the vibration is generally produced in the plane in which the mass rotates. Thus, if vibration source 430 is an eccentric rotating mass actuator, vibrations can be conducted efficiently through structural members 432 and 436. It should be appreciated that the use of multiple vibration sources can be combined to effectively utilize the particular nature of the particular vibration sources. For example, vibration source 430 could include a linear resonant actuator aligned to vibrate structural member 434 and an eccentric rotating mass actuator to vibrate structural members 432 and 436. One of ordinary skill in the art would recognize many variations, modifications, and alternatives.

Vibration source 430 can include or utilize piezoelectric actuators, linear resonant actuators, eccentric rotating mass actuators, or the like. A plurality of structural members 432, 434, and 436, which may also be referred to as spars, are attached to vibration source 430 and top face 410, left face 412, and back face 414, respectively, thereby providing for mechanical coupling between the vibration source and each of the plurality of vibratory external surfaces. Actuation of vibration source 430 will, thus, result in vibration of top face 410, left face 412, and back face 414 independently from right face 416, front face 418, and bottom face 420. Although a single vibration source 430 and three structural members 432, 434, and 436 are illustrated in FIG. 4, other embodiments can be implemented using additional vibration sources, which may be mechanically coupled to one or more external vibratory surfaces.

Using embodiments based on the principles illustrated in FIG. 4, it is possible to provide the user with a haptic experience including localized sensations, for example on one or more of bumper 210, left peripheral section 222, right peripheral section 224, or vibratory plate 240 as illustrated in FIG. 2A. Embodiments of the present disclosure enable the use of a larger number of small and potentially inexpensive haptic elements to produce localized vibration sensations at predetermined regions of the housing.

Figure 5:
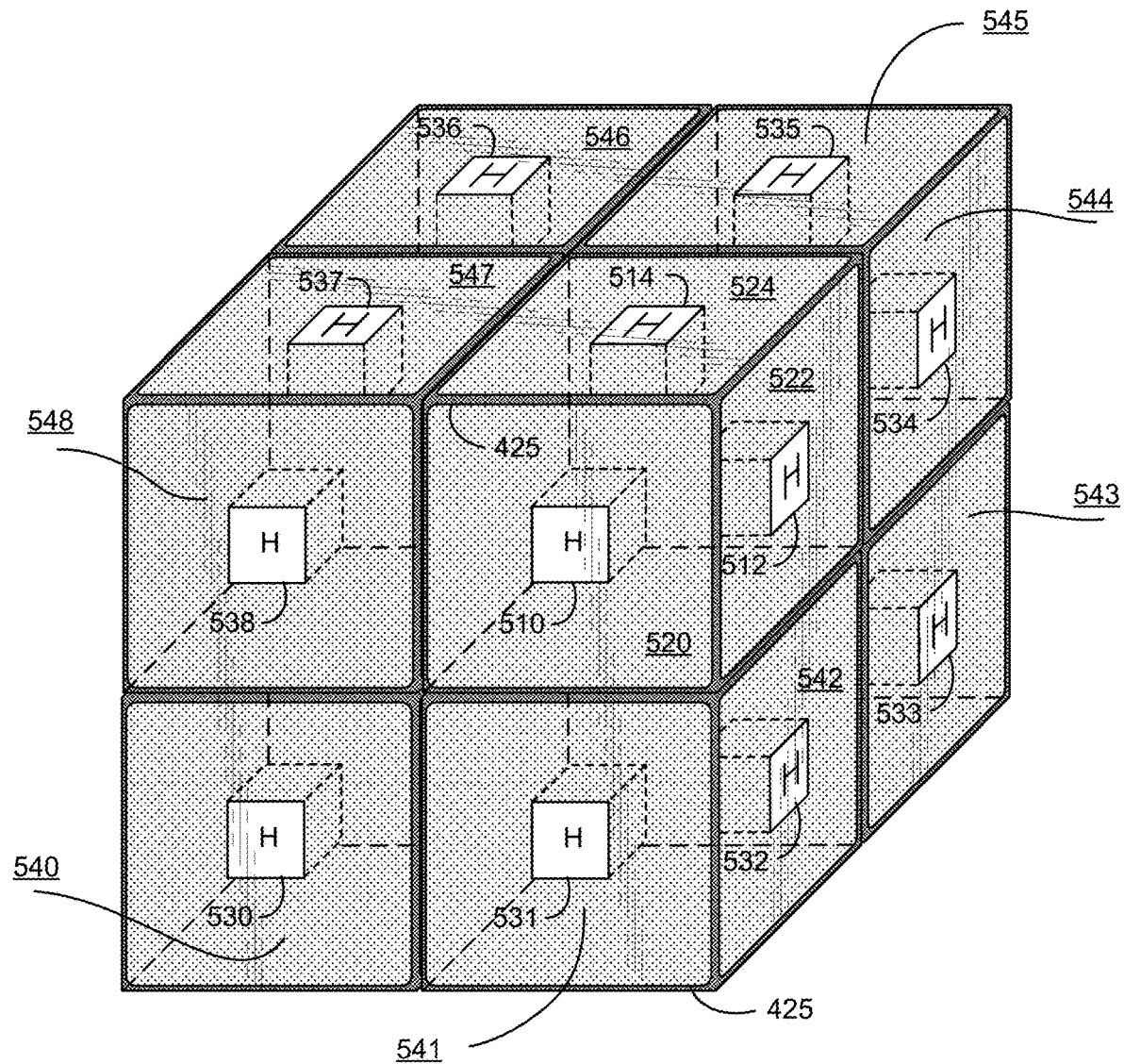
FIG. 5 schematically illustrates a pixelated structure with vibration isolated haptic elements, according to some embodiments.

FIG. 5 schematically illustrates a pixelated structure with vibration isolated haptic elements, according to some embodiments. Although external surfaces of handheld controller 500 are illustrated in FIG. 5 as twelve faces of seven cubes forming a larger cube for purposes of clarity, it will be appreciated that this illustration is merely to demonstrate the principle of operation. Thus, it will be appreciated that embodiments of the present disclosure are not limited to this cubic shape and implementation in the form of handheld controller 100 illustrated in FIGS. 1A, 1B, 2A, and 2B are included within the scope of the present disclosure.

Referring to FIG. 5, vibration sources 510, 512, and 514 are mechanically coupled to vibratory external surfaces 520, 522, and 524, respectively. Vibration sources 510, 512, and 514 can include or utilize piezoelectric actuators, linear resonant actuators, eccentric rotating mass actuators, or the like. In some embodiments, vibration sources 510, 512, and 514 are physically attached or bonded, for example, using epoxy, to vibratory external surfaces 520, 522, and 524, respectively, whereas in other embodiments, other mounting techniques are utilized to provide the desired mechanical coupling. Each of vibratory external surfaces 520, 522, and 524 are separated by a vibration dampening material disposed between each of the plurality of vibratory external surfaces. As discussed in relation to FIG. 4, vibration dampening material 425 can be, for example, foam, rubber, silicone, PDMS, cork, fabric, or the like. In some embodiments, each of the vibratory external surfaces has a periphery and the vibration dampening material that is disposed between each of the plurality of vibratory external surfaces can be an elastic band that is attached to and surrounds each of the plurality of vibratory external surfaces at the periphery. In other embodiments, vibration dampening material 425 can be positioned on the interior surface of the vibratory external surfaces. Thus, the vibratory external surfaces are able to vibrate independently from each other, thereby providing a plurality of independent vibratory external surfaces.

Although additional vibration sources 530, 531, 532, 533, 534, 535, 536, 537, and 538, are illustrated in FIG. 5, each of which are mechanically coupled to vibratory external surfaces 540, 541, 542, 543, 544, 545, 546, 547, and 548, respectively, for purposes of clarity, the discussion herein will be presented in relation to vibration sources 510, 512, and 514 are mechanically coupled to vibratory external surfaces 520, 522, and 524 and the description can be applied to the other vibration sources and vibratory external surfaces as appropriate.

As discussed in relation to FIG. 4, in some embodiments, all of the external surfaces are vibratory surfaces, whereas in other embodiments, some of the external surfaces are fixed to other elements of the handheld controller, for example, mechanically coupled to an optional frame of the handheld controller, and some of the external surfaces are vibratory external surfaces. Referring to FIG. 2A, bumper 210, left peripheral section 222, right peripheral section 224, and vibratory plate 240 are vibratory external surfaces. In the simplified handheld controller 500 illustrated in FIG. 4, vibratory external surfaces 520, 522, 524, 540, 541, 542, 543, 544, 545, 546, 547, and 548 are vibrational external surfaces, which can be correlated to the vibratory external surfaces illustrated, for example, in FIG. 2A.

Referring to vibration sources 510, 512, and 514, since each of these vibration sources is only mechanically coupled to a single, and potentially small, vibratory external surface, each of these vibration sources can be smaller, lighter, and potentially less expensive than larger vibration sources that are used to drive larger and heavier vibratory external surfaces. By subdividing the surface of handheld controller 500 into 24 "pixels," 12 of which are illustrated and 12 of which disposed on the left, back and bottom sides are not shown, it is possible to decrease the energy used to vibrate each of the pixels. As an example, if a given amount of energy is used to vibrate the entire surface of the housing, $\frac{1}{24}$ of the given amount of energy would typically be used to vibrate one of the pixels.

In some embodiments, a controller (not shown) is coupled to each of the plurality of vibration sources to effect control over the independent vibration of vibratory external surfaces 502, 522, 524, 540, 541, 542, 543, 544, 545, 546, 547, and 548.

Referring to FIGS. 4 and 5, combinations of the various mechanical coupling designs can be used. For example, one of the plurality of vibration sources can be mechanically coupled to the frame of the handheld controller and a structural member can be used to mechanically couple the vibrations generated in the vibration source to one of the plurality of vibratory external surfaces as illustrated in FIG. 4. Continuing with this example, another of the plurality of vibration sources can be bonded to one of the plurality of vibratory external surfaces as illustrated in FIG. 5. Moreover, structural members can be detachably connected to vibration sources and vibratory external surfaces, engaging the vibration source to the vibratory external surface in a first mode of operation and disengaging the vibration source from the vibratory external surface in a second mode of operation. Thus, combinations of the various implementations described herein are included within the scope of the present disclosure and enable vibration control for one or more regions of the housing in a pixelated manner. It should be noted, referring to FIG. 2A, the vibratory external surfaces illustrated in FIGS. 4 and 5 can be implemented as the individual elements including bumper 210, touch pad 212, left peripheral section 222, right peripheral section 224, vibratory plate 240, or button 214. Thus, the discussion provided in relation to the vibratory external surfaces illustrated in FIGS. 4 and 5 should be understood to apply to the surfaces of the handheld controller, including mechanically isolated individual elements, portions of the housing, as illustrated by region 120, or the like.

Figure 6:
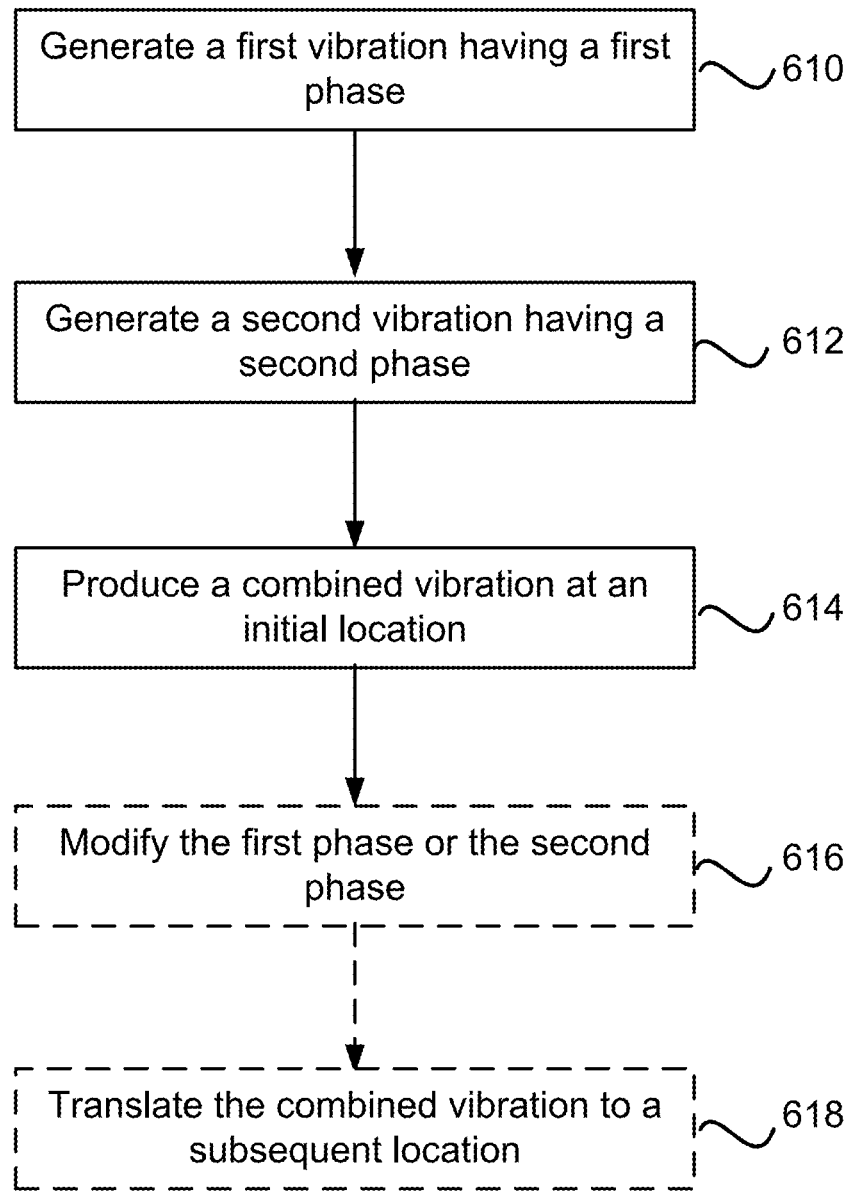
FIG. 6 is a simplified flowchart illustrating a method of operating an array of haptic elements, according to some embodiments.

FIG. 6 is a simplified flowchart illustrating a method of operating an array of haptic elements, according to some embodiments. In some embodiments, the array of haptic elements is disposed in a housing of a handheld controller. The method includes generating a first vibration using a first vibration source (610). The first vibration source, and the first vibration, as a result, is characterized by a first phase. The method also includes generating a second vibration using a second vibration source (612). The second vibration source, and the second vibration, as a result, is characterized by a second phase different from the first phase. The method also includes producing a combined vibration at an initial location on the housing (614). As described herein, the first vibration source and the second vibration source, each with a controllable phase, operate as a phased array emitter to generate a coherent constructive interference and destructive interference, thereby producing isolated vibrations, which may vary temporally, at predetermined portions of the handheld controller. The method may also include modifying at least one of the first phase or the second phase (616) and translating the combined vibration to a subsequent location different from the initial location (618).

In addition to the use of a first vibration source and a second vibration source, additional vibration sources can be utilized (e.g., a third vibration source) and the method can also include generating a third vibration using the third vibration source. The third vibration source, and the third vibration as a result, is characterized by a third phase different from at least one of the first phase or the second phase and contributes to the combined vibration. In an embodiment, the first vibration source, the second vibration source, and the third vibration source vibration source are disposed in a plane.

Referring to FIG. 2A, the combined vibration can initially be positioned at an initial location on the housing such as touch pad 212. As the phase of one or more of the vibration sources is modified, the combined vibration can be translated with respect to the geometry of the housing, for example, moving to left peripheral region 222, right peripheral region 224, or the like. Accordingly, isolated vibrations, which may be varying temporally, can be shifted in order to communicate information to the user, provide feedback to the user, enhance the user experience, or the like.

It should be appreciated that the specific steps illustrated in FIG. 6 provide a particular method of operating an array of haptic elements according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A handheld controller comprising:
a housing including an interior space;
a first vibration source disposed in the housing, wherein the interior space between the first vibration source and the housing is filled with a mechanical structure;
a second vibration source disposed in the housing, wherein the interior space between the second vibration source and the housing is filled with the mechanical structure; and
a controller disposed in the housing, coupled to the first vibration source and second vibration source, and configured to:
generate, via the first vibration source, first vibratory oscillations characterized by a first phase;
generate, via the second vibration source, second vibratory oscillations characterized by a second phase; and
vary at least one of the first phase or the second phase.

2. The handheld controller of claim 1 further comprising a third vibration source disposed in the housing, wherein the controller is configured to generate, via the third vibration source, third vibratory oscillations characterized by a third phase different from at least one of the first phase or the second phase.

3. The handheld controller of claim 2 wherein the first vibration source, the second vibration source, and the third vibration source are disposed in a plane.

4. The handheld controller of claim 3 further comprising a fourth vibration source, wherein the first vibration source, the second vibration source, the third vibration source, and the fourth vibration source form four corners of a tetrahedron.

5. The handheld controller of claim 1 wherein the mechanical structure comprises a vibration conducting material disposed between the first vibration source and the housing.

6. The handheld controller of claim 5 wherein the mechanical structure comprises the vibration conducting material disposed between the second vibration source and the housing.

7. The handheld controller of claim 1 wherein the controller is further configured to generate a combined vibration at a predetermined location on the housing.

8. A method of operating an array of haptic elements disposed in a handheld controller having a housing including an interior space, the method comprising:
generating a first vibration using a first vibration source, wherein the first vibration is characterized by a first phase;
generating a second vibration using a second vibration source, wherein the second vibration is characterized by a second phase different from the first phase;
operating a controller disposed in the housing and coupled to the first vibration source and the second vibration source, wherein the controller is configured to vary at least one of the first phase or the second phase;
propagating the first vibration through a first mechanical structure filling the interior space between the first vibration source and the housing;
propagating the second vibration through a second mechanical structure filling the interior space between the second vibration source and the housing; and
producing a combined vibration at an initial location on the housing.

9. The method of claim 8 further comprising modifying at least one of the first phase or the second phase.

10. The method of claim 9 further comprising translating the combined vibration to a subsequent location different from the initial location.

11. The method of claim 8 further comprising generating a third vibration using a third vibration source and propagating the third vibration through a third mechanical structure filling the interior space between the third vibration source and the housing, wherein the third vibration is characterized by a third phase different from at least one of the first phase or the second phase and contributes to the combined vibration.

12. The method of claim 11 wherein the first vibration source, the second vibration source, and the third vibration source are disposed in a plane.

13. The method of claim 8 wherein the array of haptic elements are disposed in a housing of a handheld controller.

14. A handheld controller comprising:
a housing comprising:
 a frame;
 one or more external surfaces; and
 a plurality of vibratory external surfaces;
a vibration source disposed in the housing, wherein the one or more external surfaces and the vibration source are mechanically coupled to the frame;
a vibration dampening material disposed between each of the plurality of vibratory external surfaces; and
a plurality of structural members, wherein each of the plurality of structural members mechanically couple one of the plurality of vibratory external surfaces to the vibration source.

15. The handheld controller of claim 14 wherein the vibration dampening material comprises an elastic band.

16. The handheld controller of claim 14 wherein each of the plurality of vibratory external surfaces comprises a periphery and the vibration dampening material surrounds each of the plurality of vibratory external surfaces at the periphery.

17. The handheld controller of claim 14 wherein each of the plurality of structural members are bonded to one of the plurality of vibratory external surfaces.

18. The handheld controller of claim 14 wherein each of the plurality of structural members are detachably connected to at least one of the vibration source and one of the plurality of vibratory external surfaces.

* * * * *